United States Patent [19]
Forté et al.

[11] Patent Number: 6,086,834
[45] Date of Patent: Jul. 11, 2000

[54] PROCESS FOR THE REMOVAL OF SILICA FROM AN ALKALINE SOLUTION CONTAINING SODIUM ALUMINATE

[75] Inventors: Guy Forté ; Rénald Dufour, both of Jonquière, Canada

[73] Assignee: Alcan International Limited, Montreal, Canada

[21] Appl. No.: 09/100,063

[22] Filed: Jun. 19, 1998

[51] Int. Cl.[7] .............................. C01F 7/00; C01F 7/02; C01F 7/04; C01F 7/16; C22B 21/00

[52] U.S. Cl. ..................... 423/121; 423/116; 423/119; 423/600

[58] Field of Search .................... 423/119, 121, 423/116, 600

[56] References Cited

U.S. PATENT DOCUMENTS

| | | | |
|---|---|---|---|
| 938,432 | 10/1909 | Peffer | 423/121 |
| 2,519,362 | 8/1950 | Flint et al. | 423/121 |
| 3,440,005 | 4/1969 | Featherston et al. | 423/119 |
| 3,997,650 | 12/1976 | Yamada et al. | 423/119 |
| 4,414,115 | 11/1983 | The . | |
| 4,426,363 | 1/1984 | Yamada et al. | 423/121 |
| 4,483,830 | 11/1984 | Cresswell et al. | 423/121 |
| 4,614,641 | 9/1986 | Grubbs | 423/127 |
| 4,661,328 | 4/1987 | Grubbs | 423/121 |
| 5,118,484 | 6/1992 | The et al. | 423/335 |

FOREIGN PATENT DOCUMENTS

| | | | |
|---|---|---|---|
| 339766 | 11/1989 | European Pat. Off. | 423/121 |
| 2020340 | 7/1970 | France . | |
| 1145105 | 3/1969 | United Kingdom | 423/121 |
| 9203381 | 3/1992 | WIPO . | |

OTHER PUBLICATIONS

The, "A Novel Approach to Post–Desilicating Bayer Process Liquor," Light Metals, San Diego, Mar. 1–5, 1992, No. Meeting 121, Mar. 1, 1992, pp. 117–122, XP000366141.

Murakami et al., "Aspect of Desilication Kinetics with Recycled Seed," Light Metals, San Diego, Mar. 1–5, 1992, No. Meeting 121, Mar. 1, 1992, pp. 113–116, XP00D366140.

*Primary Examiner*—Steven Bos
*Attorney, Agent, or Firm*—Cooper & Dunham LLP

[57] ABSTRACT

A process is described for removing dissolved silica from an alkaline solution containing sodium aluminate, e.g. a Bayer process solution. The process comprises contacting the alkaline solution with a slowly stirred bed of particles comprising coarse silica sand or a mixture of coarse silica sand and particles of sodalite, whereby the dissolved silica is precipitated out of solution to form a precipitation of desilication product dispersed in the solution and separating the desilication product solids from the alkaline solution to obtain a desilicated alkaline solution.

13 Claims, 2 Drawing Sheets

PROCESS FOR THE REMOVAL OF SILICA FROM AN ALKALINE SOLUTION CONTAINING SODIUM ALUMINATE

BACKGROUND OF THE INVENTION

This invention relates to a process to reduce silica concentration of solutions already supersaturated in silica and more specifically of Bayer liquors obtained from the digestion of bauxite in a caustic liquor.

In the Bayer process for producing alumina from bauxite, the bauxite containing aluminium hydroxides is contacted with solutions containing caustic soda to dissolve the aluminium hydroxides and some of the silica minerals, such as kaolinite, while leaving most of the remaining constituents of the bauxite essentially unattached in the solid form. The silica which is dissolved by the caustic soda solution forms a soluble sodium silicate. This reacts relatively slowly with the sodium aluminate in solution to form complex hydrated sodium aluminium silicates, known collectively as "desilication products". These desilication products, which include Bayer sodalite, are of low solubility in the resulting sodium aluminate-caustic solutions and eventually precipitate out of the solution.

Silica is a highly undesirable impurity in the Bayer liquor for two reasons: (1) when present in a super-saturated aluminate liquor it will coprecipitate with the alumina downstream and will contaminate the product, (2) when present in the Bayer liquor at a concentration above its solubility, it tends to precipitate mainly on the surface of heat exchangers, thus greatly reducing the heat transfer coefficient.

In order to keep the silica concentration in the liquor at an acceptable level, most current Bayer plants maintain the digestion conditions for the extraction of alumina from the bauxite for a time sufficient that the extracted aluminium hydroxides and the dissolved silica have time to form the desilication products prior to the separation of the unattached solids. This process may take up to an hour. In certain cases, the digestion step may also be preceded by a pre-desilication step performed at lower temperature, which is aimed at dissolving some silica in order to favour the subsequent silica precipitation reaction. Because of the longer residence time required at digestion conditions (high temperature and pressure) to allow the silica precipitation reaction to occur, premature alumina crystallization will occur and hence reduced productivity. In addition, a longer residence time means that larger size pressure vessels are required and energy requirements are higher.

U.S. Pat. No. 5,118,484 describes a process for removing dissolved silica from Bayer process solutions which comprises contacting the silica-containing solution with porous agglomerates of a material containing Bayer process desilication products bonded together by a polymeric resin. These porous agglomerates are contained in a column, with the Bayer process solution being passed through the column. The agglomerates provide a large surface area upon which is precipitated the desilication product formed by reaction between the dissolved silica and the alumina and sodium present in the Bayer process solution.

Another process in which the desilication stage is separate from the digestion stage is described in U.S. Pat. No. 4,426,363. In that case, the desilication is carried out prior to the step of separating the slurry into caustic aluminate solution and insoluble mud. That procedure has the disadvantage of transporting a very large amount of solids of which only a small portion is effective in acting as a seed surface for the desilication process.

In U.S. Pat. No. 5,545,384 there is described a process where the bauxite-liquor slurry, after being digested at a temperature between 120 to 160° C., is separated and the extract solution is sent to a desilication step which takes place after the separation of the mud. That patent recommends the use of seeds of the solid silicate substance comprising sodalite or zeolite as major components and it also recommends that these seeds should have an average particle size of between 1 $\mu$m and 30 $\mu$m.

It is the object of the present invention to provide a further simplified desilication procedure which can be utilized independently from the digestion stage.

SUMMARY OF THE INVENTION

The present invention in its broadest aspect relates to a process for removing dissolved silica from an alkaline solution containing sodium aluminate, e.g. a Bayer process solution, which comprises contacting the alkaline solution with a slowly stirred bed of particles comprising coarse silica sand or a mixture of coarse silica sand and particles of sodalite, whereby the dissolved silica is precipitated out of solution to form a precipitation of desilication product dispersed in the solution and separating the desilication product solids from the alkaline solution to obtain a desilicated alkaline solution.

The process of this invention is preferably utilized with a Bayer process solution which is either a super-saturated (pregnant) liquor or an unsaturated (spent) liquor. These can be processed without precipitating any significant amount of gibbsite.

The process is preferably carried out in a pressurized vessel and it has been found to be advantageous to remove the precipitated desilication product from the liquor which has been in contact with the bed at essentially the same temperature as the one prevailing during the precipitation reaction.

Prior to the desilication process, the Bayer process solution has most of the solid particles removed by such means as gravity separation, cyclone separation, filtration or any other conventional method of solids separation. After passing through the bed of particles in the desilication stage, the desilication product precipitated solids contained in the liquor are separated and the desilicated process solution is returned to an appropriate stream of the Bayer process.

It is particularly advantageous to have the stirred bed in the form of a dense bed, e.g. having a solids concentration of at least 50%. The dense bed provides a high surface area of solids per volume of fluid. This high solids density together with the slow agitation work to prevent solidification of particles by precipitation. It also naturally provides adequate seed surface and seed activation by attrition. This allows desilication without seed recycling and external rejuvenation of the seed activity.

In the process of this invention, the whole seed particle participates in the reaction and the silica sand particle is eventually all converted into sodalite. Then fresh sodalite precipitates onto the previously formed sodalite layer. As the solids build up due to the precipitation of sodalite in the reactor, the level of the stirred bed increases necessitating the removal of coarse sodalite in the form of a slurry. This slurry is removed through an outlet from the reactor slightly above the level of the top of the stirred bed.

The remaining liquor continues to rise to the top of the reactor and this liquor contains some fine particle size sodalite. This fine sodalite may be removed from the liquor by any convenient means, internally or externally e.g. filtering. Candle filters inside the reactor are particularly convenient for this purpose.

When a mixture of silica sand and seed is used, the ratio of silica sand to sodalite in the bed of particles is typically in the range 1:1 to 45:1. The particles of silica sand and sodalite are preferably utilized at particle sizes in the range of 50 µm to 3 mm. The desilication process is preferably carried out at a temperature in the range of 60 to 180° C.

BRIEF DESCRIPTION OF THE DRAWINGS

The invention is further described in detail by reference to the accompanying drawings wherein.

DESCRIPTION OF THE PREFERRED EMBODIMENTS

Figure 1:
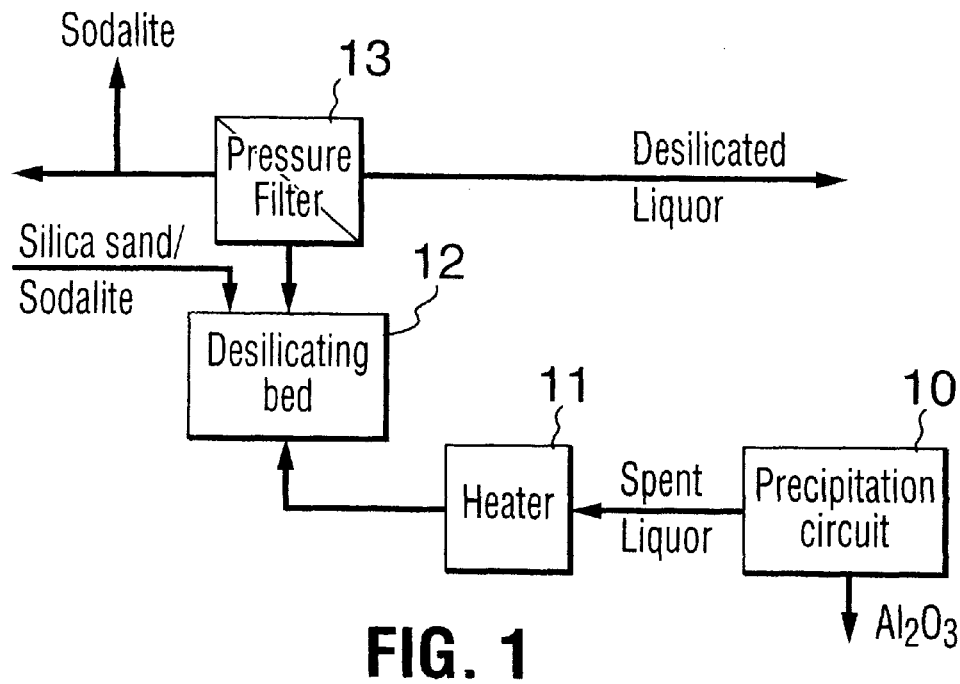
FIG. 1 is a flow diagram showing one embodiment of carrying out the present invention.

One embodiment of the invention is illustrated by FIG. 1 in which spent liquor collected from precipitation circuit 10 is heated in heater 11 and passed through the desilication stage 12 and filtration stage 13. In the filtration stage, sodalite solids product is separated from desilicated liquor with the desilicated liquor being returned to the Bayer process.

Figure 2:
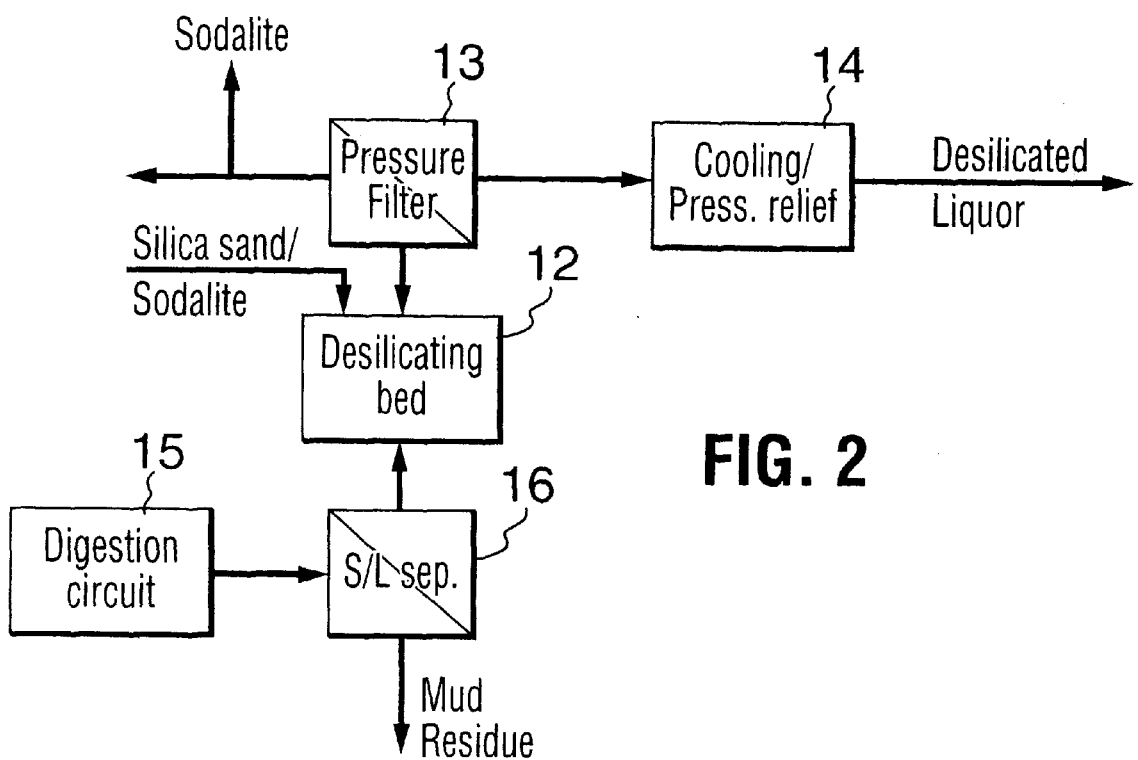
FIG. 2 is a flow diagram showing another embodiment of carrying out the present invention.

In FIG. 2 a pregnant liquor is obtained from a digestion circuit 15 and red mud separation unit 16. This pregnant liquor then passes through the desilication stage 12 and filtration stage 13 where the desilication product solids (sodalite) is separated from the desilicated liquor. This desilicated liquor may, if desired, pass through a cooling/pressure relief stage 14 before being returned to the Bayer process.

Figure 3:
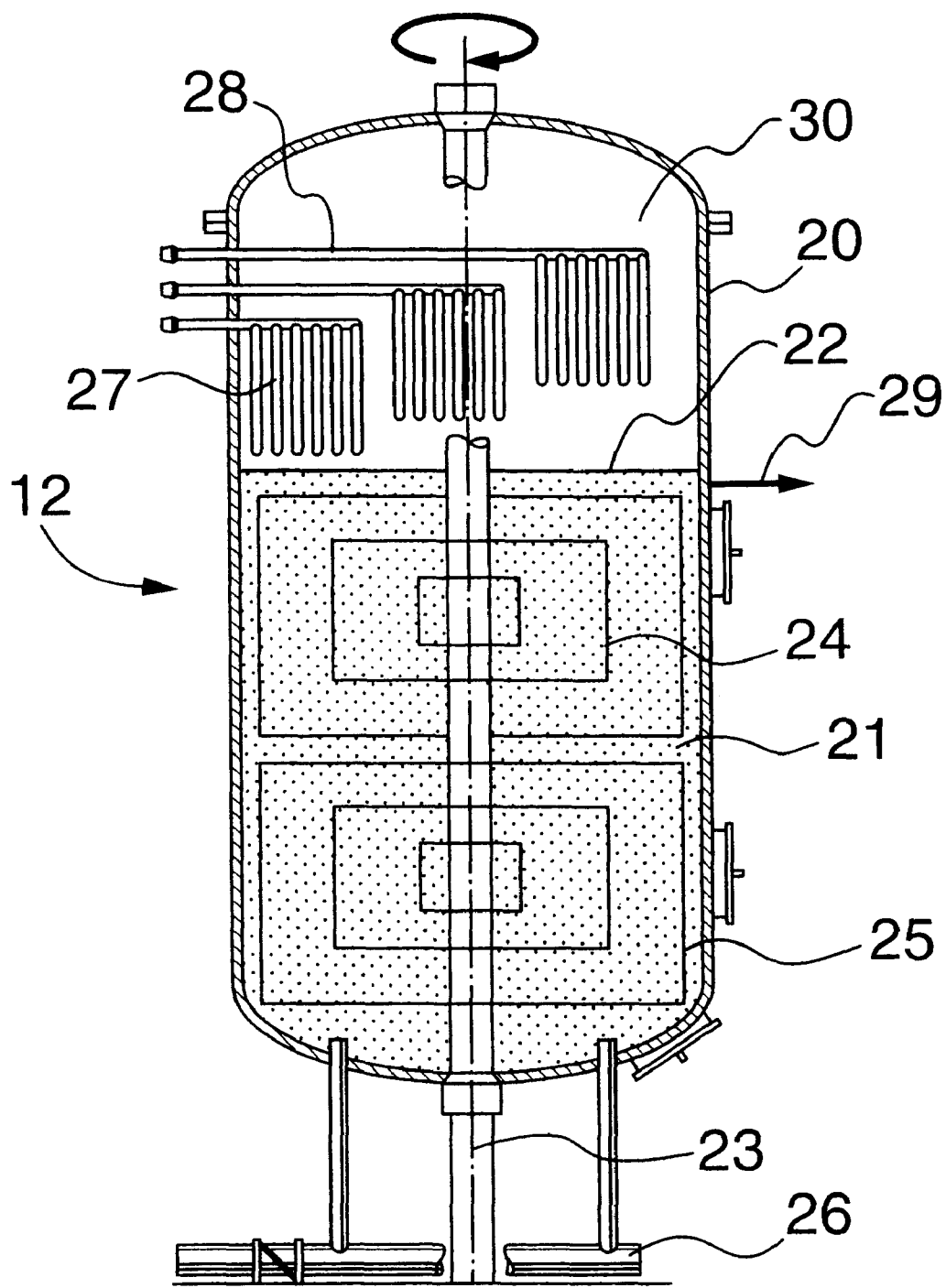
FIG. 3 is a schematic representation of a desilication vessel for use in this invention.

The desilication stage 12 of the invention is described in greater detail in FIG. 3. Thus, it comprises a cylindrical closed pressure vessel 20 containing therein a packed bed 21 of a mixture of silica sand and sodalite particles. This packed bed extends up to the level 22. Mixing blades 24 and 25 are provided for slowly stirring or mixing the packed bed. These are rotated by means of vertical shaft 23 at a rate of about 10 to 15 rpm.

The Bayer process solution containing dissolved silica is passed into the packed bed of particles 21 through inlet line 26 and the desilication process takes place within the confines of the packed bed 21. Silica sand (quartz) is transformed into sodalite within the packed bed and sodalite precipitates onto the previously formed sodalite. A desilicated process solution containing some sodalite emerges into the free space 30 located above the top surface 22 of the packed bed 21. As the solids build up due to the precipitation of sodalite in the vessel, the level 22 of the packed bed 21 increases and this necessitates the removal of coarse sodalite in the form of a slurry. This is removed from the system through outlet line 29.

The desilicated process solution contains mainly sodalite of fine particle size and this solution continue to rise through the free space 30. In free space 30, a series of candle filters 27 may be used for removing the sodalite particles from the process solution and a clean desilicated process solution is collected through line 28.

EXAMPLES

Example 1

A 7.6 L pressurized closed vessel was filled with 10000 g of coarse quartz sand and 350 g of ground plant sodalite scale. The median particle size for the quartz and the sodalite was about 1.2 mm. Bayer spent liquor at 75° C., silica supersaturated, was fed continuously to the vessel from the bottom at a flow rate of 5 L/h for a period of 21 hours. The mixture was mechanically agitated. The desilicated liquor leaving the vessel at the top was continuously filtered under pressure to remove some entrained solids. The average analytical results of the feed liquor and the desilicated liquor are presented in Table 1:

TABLE 1

| Desilication of Bayer spent liquor at 75° C. | | |
|---|---|---|
| Liquor composition | Feed g/L | Desilicated g/L |
| $SiO_2$ | 0.700 | 0.605 |
| NaOH as Na2CO3 | 189.3 | 189.5 |
| $Na_2CO_3$ | 44.5 | 43.4 |
| $Al_2O_3$ | 66.3 | 66.2 |
| Seed solids conc. | 1350 (68%) | |
| Ratio Sand/Sodalite | 29:1 | |
| Residence time | 1.5 hr | |

The silica solubility for this solution, at those conditions, was estimated at 0.101 g/L $SiO_2$, so the silica supersaturation has been reduced by 16%.

Example 2

The same vessel as in example 1 was filled with 7050 g of a mixture of coarse quartz sand and crushed sodalite scale in a mass ratio of 27:1. The vessel was fed continuously from the bottom with Bayer spent liquor, silica supersaturated, and the temperature maintained at 140° C. The mixture was mechanically agitated. The flow rate was 8.4 L/h for a period of 110 hours. The desilicated liquor leaving the vessel at the top was continuously filtered under pressure to remove some entrained solids. The average analytical results of the feed liquor and the desilicated liquor are presented in Table 2:

TABLE 2

| Desilication of Bayer spent liquor at 140 ° C. | | |
|---|---|---|
| Liquor composition | Feed g/L | Desilicated g/L |
| $SiO_2$ | 0.662 | 0.196 |
| NaOH as $Na_2CO_3$ | 208.1 | 208.1 |
| $Na_2CO_3$ | 44.7 | 43.9 |
| $Al_2O_3$ | 77.7 | 76.8 |
| Seeds solid conc. | 930 (53%) | |
| Ratio Sand/Sodalite | 27:1 | |
| Residence time | 0.9 hr | |

The silica solubility for this solution, at those conditions, was estimated at 0.166 g/L $SiO_2$, so the silica supersaturation has been reduced by 94%.

Example 3

The same setup as in example 2 was used but this time Bayer pregnant liquor from the overflow of a high rate decanter fed the desilication reactor. The temperature was maintained at 140° C. The flow rate was 9 L/h for 26 hours. The average analytical results of the feed liquor and the desilicated liquor are presented in Table 3:

TABLE 3

Desilication of Bayer pregnant liquor at 140° C.

| Liquor composition | Feed g/L | Desilicated g/L |
|---|---|---|
| $SiO_2$ | 0.691 | 0.611 |
| NaOH as $Na_2CO_3$ | 204.9 | 205.0 |
| $Na_2CO_3$ | 46.2 | 46.8 |
| $Al_2O_3$ | 138.6 | 138.0 |
| Seeds solid conc. | | 930 (53%) |
| Ratio Sand/Sodalite | | 27:1 |
| Residence time | | 0.9 hr |

The silica solubility for this solution, at those conditions, was estimated at 0.449 g/L $SiO_2$, so the silica supersaturation has been reduced by 33%.

Example 4

This was a batch test in a 45 mL pressurized vessel. A sodium aluminate solution, silica supersaturated, which also contained about 11 g/L F, was mixed with resulting solids from example 2 above, at 50% solid concentration (weight basis). The mixture was agitated at 185° C. for 30 minutes then cooled to room temperature and filtered. The analytical results of the feed liquor and the desilicated liquor are presented in Table 4:

TABLE 4

Desilication of sodium aluminate liquor at 185° C.

| Liquor composition | Feed g/L | Desilicated g/L |
|---|---|---|
| $SiO_2$ | 0.643 | 0.536 |
| NaOH total as NaOH | 37.6 | 37.2 |
| Al2O3 | 6.2 | 6.1 |

The silica solubility for this solution, at those conditions, was estimated at 0.225 g/L $SiO_2$, so the silica supersaturation has been reduced by 26%.

Example 5

The same vessel as in example 1 was filled with 7000 g of a coarse quartz sand without sodalite addition. The vessel was fed continuously from the bottom with Bayer spent liquor, silica supersaturated, and the temperature maintained at 140° C. The mixture was mechanically agitated. The flow rate was 9 L/h for a period of 280 hours. The desilicated liquor leaving the vessel at the top was continuously filtered under pressure to remove some entrained solids. The average analytical results of the feed liquor and the desilicated liquor are presented in Table 5:

TABLE 5

Desilication of Bayer spent liquor at 140° C.

| Liquor composition | Feed g/L | Desilicated g/L |
|---|---|---|
| $SiO_2$ | 0.789 | 0.287 |
| NaOH as $Na_2CO_3$ | 206.8 | 207.6 |
| $Na_2CO_3$ | 29.8 | 28.9 |
| $Al_2O_3$ | 75.3 | 74.0 |
| Seeds solid conc. | | 920 (52%) |
| Ratio Sand/Sodalite | | pure sand |
| Residence time | | 0.86 hr |

The silica solubility for this solution, at those conditions, was estimated at 0.160 g/l $SiO_2$, so the silica supersaturation has been reduced by 80%.

What is claimed is:

1. A process for removing dissolved silica from an alkaline solution containing sodium aluminate which comprises contacting the alkaline solution with a slowly stirred dense bed of particles comprising coarse silica sand or a mixture of coarse silica sand and particles of sodalite, thereby precipitating dissolved silica out of solution to form a precipitation of desilication product dispersed in the solution and separating the solids desilication product from the alkaline solution to obtain a desilicated alkaline solution.

2. The process according to claim 1 wherein the desilication is carried out in a pressure vessel.

3. The process according to claim 1 wherein the ratio of silica sand to sodalite in the bed of particles is in the range of 1:1 to 45:1.

4. The process according to claim 3 wherein the silica sand and sodalite have particle sizes in the range of 50 μm to 3 mm.

5. The process of claim 4 wherein the bed of particles has a solids concentration of at least 50%.

6. The process according to claim 4 wherein the desilication is carried out at a temperature in the range of 60 to 180° C.

7. The process of claim 4 wherein the sodium aluminate-containing solution travels upwardly through the dense bed of particles and emerges into a free space within the vessel above the dense bed.

8. The process of claim 7 wherein a slurry of coarse sodalite is removed from the vessel at the level of the dense bed.

9. The process of claim 8 wherein the slurry of coarse sodalite being removed is the result of solids buildup due to precipitation of sodalite within the dense bed.

10. The process according to claim 1 wherein the alkaline solution is a Bayer pregnant liquor or a Bayer spent liquor.

11. The process according to claim 7 wherein the process solution in the free space above the bed of particles is filtered to remove the particles of sodalite therefrom.

12. The process according to claim 1, wherein the bed has a solids concentration of at least 50%.

13. The process according to claim 12, wherein said sand is quartz sand having particle sizes in the range of 50 microns to 3 mm.

* * * * *